United States Patent
Gajjar et al.

(10) Patent No.: US 11,711,278 B2
(45) Date of Patent: Jul. 25, 2023

(54) VISUALIZATION OF FLOW TRACE OPERATION ACROSS MULTIPLE SITES

(71) Applicant: VMware, Inc., Palo Alto, CA (US)

(72) Inventors: Pritesh Ramesh Gajjar, Pune (IN); Pavan Vaidyula, Pune (IN); Tarang Khandelwal, Pune (IN); Shrinivas Sharad Parashar, Pune (IN); Vaishnavi Ramamoorthy, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/530,898

(22) Filed: Nov. 19, 2021

(65) Prior Publication Data
US 2023/0023956 A1    Jan. 26, 2023

(30) Foreign Application Priority Data
Jul. 24, 2021   (IN) .............................. 202141033335

(51) Int. Cl.
*H04L 43/045*   (2022.01)
*H04L 45/42*    (2022.01)
(Continued)

(52) U.S. Cl.
CPC ............ *H04L 43/045* (2013.01); *H04L 43/50* (2013.01); *H04L 45/42* (2013.01); *H04L 41/12* (2013.01)

(58) Field of Classification Search
CPC ....... H04L 43/045; H04L 43/50; H04L 45/42; H04L 41/12
See application file for complete search history.

(56) References Cited

U.S. PATENT DOCUMENTS

| | | |
|---|---|---|
| 5,224,100 A | 6/1993 | Lee et al. |
| 5,245,609 A | 9/1993 | Ofek et al. |
| (Continued) | | |

FOREIGN PATENT DOCUMENTS

| | | |
|---|---|---|
| EP | 1154601 A1 | 11/2001 |
| JP | 2002141905 A | 5/2002 |
| (Continued) | | |

OTHER PUBLICATIONS

Non-Published commonly Owned U.S. Appl. No. 17/732,440, filed Apr. 28, 2022, 46 pages, VMware, Inc.
(Continued)

*Primary Examiner* — Glenton B Burgess
*Assistant Examiner* — Rachel J Hackenberg
(74) *Attorney, Agent, or Firm* — Adeli LLP

(57) ABSTRACT

Some embodiments provide a method for presenting a visualization of a data message flow within a logical network that is implemented across multiple sites. The method receives flow tracing data regarding the data message flow from a source endpoint in a first site to a second endpoint in a second site. The data message flow is processed according to logical forwarding elements (LFEs) implemented in at least the first and second sites. For each of the sites through which the data message flow passes, the method identifies the LFEs that process the data message flow in the site. The method presents a visualization for the data message flow. The visualization includes a separate section for each site through which the data message flow passes. Each section indicates at least a subset of the LFEs that process the data message flow in the corresponding site for the section.

24 Claims, 10 Drawing Sheets

(51) Int. Cl.
*H04L 43/50* (2022.01)
*H04L 41/12* (2022.01)

(56) References Cited

U.S. PATENT DOCUMENTS

| | | | |
|---|---|---|---|
| 5,265,092 A | 11/1993 | Soloway et al. | |
| 5,504,921 A | 4/1996 | Dev et al. | |
| 5,550,816 A | 8/1996 | Hardwick et al. | |
| 5,729,685 A | 3/1998 | Chatwani et al. | |
| 5,751,967 A | 5/1998 | Raab et al. | |
| 5,781,534 A | 7/1998 | Perlman et al. | |
| 5,805,819 A * | 9/1998 | Chin | H04L 41/22 709/224 |
| 6,104,699 A | 8/2000 | Holender et al. | |
| 6,104,700 A | 8/2000 | Haddock et al. | |
| 6,141,738 A | 10/2000 | Munter et al. | |
| 6,219,699 B1 | 4/2001 | McCloghrie et al. | |
| 6,430,160 B1 | 8/2002 | Smith et al. | |
| 6,456,624 B1 | 9/2002 | Eccles et al. | |
| 6,512,745 B1 | 1/2003 | Abe et al. | |
| 6,539,432 B1 | 3/2003 | Taguchi et al. | |
| 6,658,002 B1 | 12/2003 | Ross et al. | |
| 6,680,934 B1 | 1/2004 | Cain | |
| 6,721,334 B1 | 4/2004 | Ketcham | |
| 6,785,843 B1 | 8/2004 | McRae et al. | |
| 6,882,642 B1 | 4/2005 | Kejriwal et al. | |
| 6,941,487 B1 | 9/2005 | Balakrishnan et al. | |
| 6,963,585 B1 | 11/2005 | Pennec et al. | |
| 6,999,454 B1 | 2/2006 | Crump | |
| 7,013,342 B2 | 3/2006 | Riddle | |
| 7,062,559 B2 | 6/2006 | Yoshimura et al. | |
| 7,079,544 B2 | 7/2006 | Wakayama et al. | |
| 7,180,856 B1 | 2/2007 | Breslau et al. | |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,243,143 B1 | 7/2007 | Bullard | |
| 7,283,473 B2 | 10/2007 | Arndt et al. | |
| 7,315,985 B1 | 1/2008 | Gauvin et al. | |
| 7,342,916 B2 | 3/2008 | Das et al. | |
| 7,360,158 B1 | 4/2008 | Beeman | |
| 7,391,771 B2 | 6/2008 | Orava et al. | |
| 7,450,598 B2 | 11/2008 | Chen et al. | |
| 7,457,870 B1 | 11/2008 | Lownsbrough et al. | |
| 7,463,579 B2 | 12/2008 | Lapuh et al. | |
| 7,478,173 B1 | 1/2009 | Delco | |
| 7,483,370 B1 | 1/2009 | Dayal et al. | |
| 7,555,002 B2 | 6/2009 | Arndt et al. | |
| 7,577,131 B2 | 8/2009 | Joseph et al. | |
| 7,590,133 B2 | 9/2009 | Hatae et al. | |
| 7,602,723 B2 | 10/2009 | Mandato et al. | |
| 7,606,260 B2 | 10/2009 | Oguchi et al. | |
| 7,627,692 B2 | 12/2009 | Pessi | |
| 7,633,955 B1 | 12/2009 | Saraiya et al. | |
| 7,639,625 B2 | 12/2009 | Kaminsky et al. | |
| 7,643,488 B2 | 1/2010 | Khanna et al. | |
| 7,649,851 B2 | 1/2010 | Takashige et al. | |
| 7,706,266 B2 | 4/2010 | Plamondon | |
| 7,710,874 B2 | 5/2010 | Balakrishnan et al. | |
| 7,729,245 B1 | 6/2010 | Breslau et al. | |
| 7,760,735 B1 | 7/2010 | Chen et al. | |
| 7,764,599 B2 | 7/2010 | Doi et al. | |
| 7,792,987 B1 | 9/2010 | Vohra et al. | |
| 7,802,000 B1 | 9/2010 | Huang et al. | |
| 7,808,919 B2 | 10/2010 | Nadeau et al. | |
| 7,808,929 B2 | 10/2010 | Wong et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,885,276 B1 | 2/2011 | Lin | |
| 7,936,770 B1 | 5/2011 | Frattura et al. | |
| 7,937,438 B1 | 5/2011 | Miller et al. | |
| 7,937,492 B1 | 5/2011 | Kompella et al. | |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,024,478 B2 | 9/2011 | Patel | |
| 8,027,354 B1 | 9/2011 | Portolani et al. | |
| 8,031,606 B2 | 10/2011 | Memon et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,161,270 B1 | 4/2012 | Parker et al. | |
| 8,166,201 B2 | 4/2012 | Richardson et al. | |
| 8,199,750 B1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,254,273 B2 | 8/2012 | Kaminsky et al. | |
| 8,265,062 B2 | 9/2012 | Tang et al. | |
| 8,265,075 B2 | 9/2012 | Pandey | |
| 8,281,067 B2 | 10/2012 | Stolowitz | |
| 8,290,137 B2 | 10/2012 | Yurchenko et al. | |
| 8,306,043 B2 | 11/2012 | Breslau et al. | |
| 8,312,129 B1 | 11/2012 | Miller et al. | |
| 8,339,959 B1 | 12/2012 | Moisand et al. | |
| 8,339,994 B2 | 12/2012 | Gnanasekaran et al. | |
| 8,345,558 B2 | 1/2013 | Nicholson et al. | |
| 8,351,418 B2 | 1/2013 | Zhao et al. | |
| 8,359,576 B2 | 1/2013 | Prasad et al. | |
| 8,456,984 B2 | 6/2013 | Ranganathan et al. | |
| 8,504,718 B2 | 8/2013 | Wang et al. | |
| 8,565,108 B1 | 10/2013 | Marshall et al. | |
| 8,571,031 B2 | 10/2013 | Davies et al. | |
| 8,611,351 B2 | 12/2013 | Gooch et al. | |
| 8,612,627 B1 | 12/2013 | Brandwine | |
| 8,625,594 B2 | 1/2014 | Safrai et al. | |
| 8,625,603 B1 | 1/2014 | Ramakrishnan et al. | |
| 8,625,616 B2 | 1/2014 | Vobbilisetty et al. | |
| 8,644,188 B1 | 2/2014 | Brandwine et al. | |
| 8,645,952 B2 | 2/2014 | Biswas et al. | |
| 8,750,288 B2 | 6/2014 | Nakil et al. | |
| 8,762,501 B2 | 6/2014 | Kempf et al. | |
| 8,806,005 B2 | 8/2014 | Miri et al. | |
| 8,837,300 B2 | 9/2014 | Nedeltchev et al. | |
| 8,838,743 B2 | 9/2014 | Lewites et al. | |
| 8,929,221 B2 | 1/2015 | Breslau et al. | |
| 8,934,495 B1 | 1/2015 | Hilton et al. | |
| 9,059,926 B2 | 6/2015 | Akhter et al. | |
| 9,197,529 B2 | 11/2015 | Ganichev et al. | |
| 9,226,220 B2 | 12/2015 | Banks et al. | |
| 9,258,195 B1 * | 2/2016 | Pendleton | H04L 67/75 |
| 9,280,448 B2 | 3/2016 | Farrell et al. | |
| 9,282,019 B2 | 3/2016 | Ganichev et al. | |
| 9,344,349 B2 | 5/2016 | Ganichev et al. | |
| 9,407,580 B2 | 8/2016 | Ganichev et al. | |
| 9,602,334 B2 | 3/2017 | Benny | |
| 9,729,433 B2 | 8/2017 | Polland | |
| 9,860,151 B2 | 1/2018 | Ganichev et al. | |
| 9,898,317 B2 | 2/2018 | Nakil et al. | |
| 10,044,581 B1 | 8/2018 | Russell | |
| 10,181,993 B2 | 1/2019 | Ganichev et al. | |
| 10,200,306 B2 | 2/2019 | Nhu et al. | |
| 10,469,342 B2 | 11/2019 | Lenglet et al. | |
| 10,608,887 B2 | 3/2020 | Jain et al. | |
| 10,728,121 B1 | 7/2020 | Chitalia et al. | |
| 10,778,557 B2 | 9/2020 | Ganichev et al. | |
| 10,805,239 B2 | 10/2020 | Nhu et al. | |
| 11,075,847 B1 | 7/2021 | Kwan et al. | |
| 11,128,550 B2 | 9/2021 | Lenglet et al. | |
| 11,196,628 B1 | 12/2021 | Shen et al. | |
| 11,201,808 B2 | 12/2021 | Ganichev et al. | |
| 11,336,533 B1 | 5/2022 | Bogado et al. | |
| 11,336,590 B2 | 5/2022 | Nhu et al. | |
| 2001/0020266 A1 | 9/2001 | Kojima et al. | |
| 2001/0043614 A1 | 11/2001 | Viswanadham et al. | |
| 2002/0093952 A1 | 7/2002 | Gonda | |
| 2002/0112060 A1 | 8/2002 | Kato | |

(56) References Cited

U.S. PATENT DOCUMENTS

| | | |
|---|---|---|
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0149604 A1 | 7/2005 | Navada |
| 2005/0182853 A1 | 8/2005 | Lewites et al. |
| 2005/0220030 A1* | 10/2005 | Nagami .................. H04L 45/50 370/241 |
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |
| 2006/0218447 A1 | 9/2006 | Garcia et al. |
| 2006/0221961 A1 | 10/2006 | Basso et al. |
| 2006/0282895 A1 | 12/2006 | Rentzis et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0097982 A1 | 5/2007 | Wen et al. |
| 2007/0156919 A1 | 7/2007 | Potti et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0021925 A1 | 1/2008 | Sweeney |
| 2008/0049614 A1 | 2/2008 | Briscoe et al. |
| 2008/0049621 A1 | 2/2008 | McGuire et al. |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0112551 A1 | 5/2008 | Forbes et al. |
| 2008/0159301 A1 | 7/2008 | Heer |
| 2008/0240095 A1 | 10/2008 | Basturk |
| 2009/0010254 A1 | 1/2009 | Shimada |
| 2009/0100298 A1 | 4/2009 | Lange et al. |
| 2009/0109973 A1 | 4/2009 | Ilnicki |
| 2009/0150527 A1 | 6/2009 | Tripathi et al. |
| 2009/0245138 A1 | 10/2009 | Sapsford et al. |
| 2009/0248895 A1 | 10/2009 | Archer et al. |
| 2009/0249213 A1 | 10/2009 | Murase et al. |
| 2009/0292858 A1 | 11/2009 | Lambeth et al. |
| 2009/0327903 A1 | 12/2009 | Smith et al. |
| 2010/0128623 A1 | 5/2010 | Dunn et al. |
| 2010/0131636 A1 | 5/2010 | Suri et al. |
| 2010/0188976 A1 | 7/2010 | Rahman et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0055710 A1 | 3/2011 | Kirkby et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0137602 A1 | 6/2011 | Desineni et al. |
| 2011/0194567 A1 | 8/2011 | Shen |
| 2011/0202920 A1 | 8/2011 | Takase |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0079478 A1 | 3/2012 | Galles et al. |
| 2012/0151352 A1 | 6/2012 | Ramprasad et al. |
| 2012/0159454 A1 | 6/2012 | Barham et al. |
| 2012/0182992 A1 | 7/2012 | Cowart et al. |
| 2012/0275331 A1 | 11/2012 | Benkö et al. |
| 2012/0287791 A1 | 11/2012 | Xi et al. |
| 2012/0314599 A1 | 12/2012 | Vilke et al. |
| 2013/0010600 A1 | 1/2013 | Jocha et al. |
| 2013/0019008 A1 | 1/2013 | Jorgenson et al. |
| 2013/0024579 A1 | 1/2013 | Zhang et al. |
| 2013/0031233 A1 | 1/2013 | Feng et al. |
| 2013/0041934 A1 | 2/2013 | Annamalaisami et al. |
| 2013/0044636 A1 | 2/2013 | Koponen et al. |
| 2013/0054761 A1 | 2/2013 | Kempf et al. |
| 2013/0058346 A1 | 3/2013 | Sridharan et al. |
| 2013/0067067 A1 | 3/2013 | Miri et al. |
| 2013/0125120 A1 | 5/2013 | Zhang et al. |
| 2013/0163427 A1 | 6/2013 | Beliveau et al. |
| 2013/0163475 A1 | 6/2013 | Beliveau et al. |
| 2013/0294249 A1 | 11/2013 | Lin et al. |
| 2013/0332602 A1 | 12/2013 | Nakil et al. |
| 2013/0332983 A1 | 12/2013 | Koorevaar et al. |
| 2013/0339544 A1 | 12/2013 | Mithyantha |
| 2014/0019639 A1 | 1/2014 | Ueno |
| 2014/0029451 A1 | 1/2014 | Nguyen |
| 2014/0115578 A1 | 4/2014 | Cooper et al. |
| 2014/0119203 A1 | 5/2014 | Sundaram et al. |
| 2014/0126418 A1 | 5/2014 | Brendel et al. |
| 2014/0157405 A1 | 6/2014 | Joll et al. |
| 2014/0177633 A1 | 6/2014 | Manula et al. |
| 2014/0195666 A1 | 7/2014 | Dumitriu et al. |
| 2014/0207926 A1 | 7/2014 | Benny |
| 2014/0219086 A1 | 8/2014 | Cantu' et al. |
| 2014/0281030 A1 | 9/2014 | Cui et al. |
| 2014/0282823 A1 | 9/2014 | Rash et al. |
| 2014/0297846 A1 | 10/2014 | Hoja et al. |
| 2014/0304393 A1 | 10/2014 | Annamalaisami et al. |
| 2014/0351415 A1 | 11/2014 | Harrigan et al. |
| 2015/0016286 A1 | 1/2015 | Ganichev et al. |
| 2015/0016287 A1 | 1/2015 | Ganichev et al. |
| 2015/0016298 A1 | 1/2015 | Ganichev et al. |
| 2015/0016469 A1 | 1/2015 | Ganichev et al. |
| 2015/0043378 A1 | 2/2015 | Bardgett et al. |
| 2015/0180755 A1 | 6/2015 | Zhang et al. |
| 2015/0195169 A1 | 7/2015 | Liu et al. |
| 2015/0263899 A1 | 9/2015 | Tubaltsev et al. |
| 2015/0271011 A1 | 9/2015 | Neginhal et al. |
| 2015/0281036 A1 | 10/2015 | Sun et al. |
| 2016/0105333 A1 | 4/2016 | Lenglet et al. |
| 2016/0119204 A1 | 4/2016 | Murasato et al. |
| 2016/0142291 A1 | 5/2016 | Polland |
| 2016/0149791 A1 | 5/2016 | Ganichev et al. |
| 2016/0226741 A1 | 8/2016 | Ganichev et al. |
| 2016/0274558 A1 | 9/2016 | Strohmenger et al. |
| 2016/0359880 A1 | 12/2016 | Pang et al. |
| 2017/0026270 A1* | 1/2017 | Handige Shankar ... H04L 43/04 |
| 2017/0126728 A1 | 5/2017 | Beam et al. |
| 2017/0222881 A1 | 8/2017 | Holbrook et al. |
| 2017/0288991 A1* | 10/2017 | Ganesh ............... H04L 41/0631 |
| 2017/0302530 A1 | 10/2017 | Wolting |
| 2017/0310574 A1 | 10/2017 | Wolting |
| 2017/0317954 A1 | 11/2017 | Masurekar et al. |
| 2017/0358111 A1 | 12/2017 | Madsen |
| 2017/0373950 A1 | 12/2017 | Szilagyi et al. |
| 2018/0062939 A1 | 3/2018 | Kulkarni et al. |
| 2018/0063188 A1 | 3/2018 | Karin et al. |

(56) References Cited

U.S. PATENT DOCUMENTS

| | | |
|---|---|---|
| 2018/0091388 A1 | 3/2018 | Levy et al. |
| 2018/0102959 A1 | 4/2018 | Ganichev et al. |
| 2018/0123903 A1 | 5/2018 | Holla et al. |
| 2018/0136798 A1 | 5/2018 | Aggour et al. |
| 2018/0219751 A1 | 8/2018 | Cavuto et al. |
| 2018/0262447 A1 | 9/2018 | Nhu et al. |
| 2018/0262594 A1* | 9/2018 | Nhu .................. H04L 41/22 |
| 2018/0309637 A1 | 10/2018 | Gill et al. |
| 2018/0373961 A1 | 12/2018 | Wang et al. |
| 2019/0014029 A1 | 1/2019 | Burgio et al. |
| 2019/0109769 A1 | 4/2019 | Jain et al. |
| 2019/0140931 A1 | 5/2019 | Ganichev et al. |
| 2019/0158377 A1 | 5/2019 | Chau |
| 2020/0067799 A1 | 2/2020 | Lenglet et al. |
| 2020/0106744 A1 | 4/2020 | Miriyala et al. |
| 2020/0136943 A1 | 4/2020 | Banyai et al. |
| 2020/0169476 A1 | 5/2020 | Vela et al. |
| 2020/0204457 A1* | 6/2020 | Hu .................... H04L 45/16 |
| 2020/0210195 A1 | 7/2020 | Lampert et al. |
| 2020/0304389 A1 | 9/2020 | Bauan et al. |
| 2020/0313985 A1 | 10/2020 | Jayakumar et al. |
| 2020/0322243 A1 | 10/2020 | Xi et al. |
| 2020/0322249 A1 | 10/2020 | Liu et al. |
| 2020/0336387 A1 | 10/2020 | Suzuki et al. |
| 2021/0014157 A1 | 1/2021 | Zhou |
| 2021/0029059 A1 | 1/2021 | Nhu et al. |
| 2021/0051100 A1 | 2/2021 | Chitalia et al. |
| 2021/0051109 A1 | 2/2021 | Chitalia et al. |
| 2021/0092064 A1 | 3/2021 | Sidebottom et al. |
| 2021/0216908 A1 | 7/2021 | Lu et al. |
| 2021/0218630 A1 | 7/2021 | Lu et al. |
| 2021/0218652 A1 | 7/2021 | Raut et al. |
| 2021/0226880 A1 | 7/2021 | Ramamoorthy et al. |
| 2021/0266259 A1 | 8/2021 | Renner, III et al. |
| 2021/0311764 A1 | 10/2021 | Rosoff et al. |
| 2022/0014451 A1 | 1/2022 | Naik et al. |
| 2022/0038368 A1 | 2/2022 | Shen et al. |
| 2022/0038501 A1 | 2/2022 | Shen et al. |
| 2022/0103452 A1 | 3/2022 | Ganichev et al. |
| 2022/0150136 A1 | 5/2022 | Chen |
| 2022/0165035 A1* | 5/2022 | Cui ................... H04L 43/106 |
| 2022/0210120 A1 | 6/2022 | Nigam et al. |
| 2022/0224620 A1* | 7/2022 | Chhabra .............. H04L 43/103 |
| 2022/0263721 A1 | 8/2022 | Bogado et al. |

FOREIGN PATENT DOCUMENTS

| | | |
|---|---|---|
| JP | 2003069609 A | 3/2003 |
| JP | 2003124976 A | 4/2003 |
| JP | 2003318949 A | 11/2003 |
| WO | 9506989 A1 | 3/1995 |
| WO | 2012126488 A1 | 9/2012 |
| WO | 2013184846 A1 | 12/2013 |
| WO | 2015005968 A1 | 1/2015 |

OTHER PUBLICATIONS

Non-Published commonly Owned U.S. Appl. No. 17/185,690, filed Feb. 25, 2021, 38 pages, VMware, Inc.

Non-Published commonly Owned U.S. Appl. No. 17/185,824, filed Feb. 25, 2021, 32 pages, VMware, Inc.

Non-Published commonly Owned U.S. Appl. No. 17/507,449, filed Oct. 21, 2021, 47 pages, VMware, Inc.

Non-Published commonly Owned U.S. Appl. No. 17/507,453, filed Oct. 21, 2021, 48 pages, VMware, Inc.

Non-Published commonly Owned U.S. Appl. No. 17/507,462, filed Oct. 21, 2021, 47 pages, VMware, Inc.

Non-Published commonly Owned U.S. Appl. No. 17/530,826, filed Nov. 19, 2021, 39 pages, VMware, Inc.

Non-Published commonly Owned U.S. Appl. No. 17/548,400, filed Dec. 10, 2021, 55 pages, Nicira, Inc.

Phaal, Peter, et al., "sFlow Version 5," Jul. 2004, 46 pages, available at http://www.sflow.org/sflow_version_5.txt.

Phan, Doantam, et al., "Visual Analysis of Network Flow Data with Timelines and Event Plots," VizSEC 2007, Month Unknown 2007, 16 pages.

Levin, Anna, et al., "Network Monitoring in Federated Cloud Environment," 2017 IEEE International Conference on Smart Computing, May 29-31, 2017, 6 pages, IEEE, Hong Kong, China.

* cited by examiner

VISUALIZATION OF FLOW TRACE OPERATION ACROSS MULTIPLE SITES

BACKGROUND

As more networks move to the cloud, it is more common for one corporation or other entity to have networks spanning multiple sites. Much like with single-site logical networks, administrators may want to troubleshoot these networks using flow tracing operations. As networks that span multiple sites may be more complicated, there are additional difficulties in properly visualizing these flow tracing operations across multiple sites.

BRIEF SUMMARY

Some embodiments of the invention provide a method for presenting a visualization of a flow tracing operation within a logical network that is implemented across multiple sites (e.g., multiple federated datacenters in different locations). The method receives flow tracing data regarding a data message flow that is sent from a source endpoint in a first one of the sites to a destination endpoint in a second one of the sites (possibly flowing through other sites as well) and that is processed according to logical forwarding elements (LFEs) implemented in at least the first and second sites. The method identifies the LFEs that process the data message flow in each site through which the data message flow passes and presents a visualization for the data message flow that includes a separate section for each of these sites. Each of these sections indicates the LFEs that process the data message flow in the corresponding site.

In some embodiments, the method is performed by a network management and control system that receives flow tracing data from physical forwarding elements (PFEs) that implement the LFEs that process the data message flow at each of the sites through which the data message flow passes. These PFEs (e.g., software and/or hardware forwarding elements) are configured by the network management and control system to send flow tracing data to a central controller or controller cluster at their respective site (e.g., directly, or via local controllers that execute on host computers alongside the PFEs). The network management and control system is also responsible for injecting flow tracing data messages at the source endpoint, which are marked (e.g., with a flag bit) in some embodiments so that (i) the PFEs that process the marked data messages know to provide flow tracing data to the network management and control system and (ii) the PFE at the destination endpoint does not actually deliver the data message to this endpoint.

The PFEs, in some embodiments, send the flow tracing data to the controllers as control messages that indicate that the forwarding element has performed a specific action or actions, such as physical receipt of a data message at a particular port, ingress of a packet to an LFE, logical forwarding of a data message according to an LFE, application of a firewall, access control, or other rule for an LFE to a data message, physical forwarding (e.g., encapsulation and output) of a data message, dropping a data message, delivery of a data message to its destination, etc. The controllers and/or network managers at each site aggregate the flow tracing data for a particular flow tracing operation and pass this data to a centralized controller and/or manager cluster in some embodiments. The centralized controller and/or manager cluster is thus able to use the data from all of the sites to generate the visualization of the processing of the data message flow across the multiple sites.

The visualization of the flow tracing operation, as mentioned, displays a separate section for each site through which the data message flow passes, as well as at least a subset of the LFEs that process the data message flow in each site. In some embodiments, these sections are presented as vertical segments of the visualization display, with the section corresponding to the source site (i.e., the site at which the source endpoint is located) on one side and the section corresponding to the destination site (i.e., the site at which the destination endpoint is located) on the other side of the display. Some embodiments also use arrows to indicate the direction of the flow, which can be useful when a data message flow is sent from a first site to one or more additional sites and then back to the first site. In this case, different embodiments either use a strictly unidirectional (e.g., left-to-right) orientation and di splay multiple sections corresponding to the first site or have the data message flow visualization indicate movement from the first section to the other sections and then back to the first section.

The LFEs that process the data message and are displayed within the sections of the visualization may include at least logical routers and logical switches. Logical switches that process a data message, in some embodiments, can include user-configured logical switches to which the network endpoints connect as well as auto-configured logical switches that are used to connect gateways of the same logical router across multiple sites (also referred to as backplane logical switches). When a logical switch (of any type) spans multiple sites, some embodiments use tunnels between logical network gateways (also referred to as remote tunnel endpoints, or RTEPs) at each site that handle communication across sites. When a data message is sent from a first PFE executing on a host computer in one site to a second PFE executing on a host computer in another site (based on logical switch processing performed by the first PFE), the first PFE transmits the data message to a first logical network gateway associated with the logical switch in the first site, which transmits the data message to a second logical network gateway associated with the logical switch in the second site via the RTEP channel, which then transmits the data message to the second PFE. Some embodiments display the logical network gateways in the flow tracing operation (e.g., as a single GUI item on the boundary between the two sites) in addition to the user-configured logical switches.

Logical routers, in some embodiments, may include tier-0 logical routers (which connect directly to external networks, such as the Internet) and tier-1 logical routers (which may be interposed between logical switches and tier-0 logical routers). Tier-1 logical routers, in some embodiments, may have only a distributed routing component (DR), or may have both distributed routing components as well as centralized routing components (also referred to as service routing components, or SRs). SRs, for tier-1 routers, allow for centralized (e.g., stateful) services to be performed on data messages sent between DCNs connected to logical switches that connect to the tier-1 logical router and either DCNs connected to other logical switches that do not connect to the tier-1 logical router or external network endpoints. Tier-1 logical routers may be connected to tier-0 logical routers in some embodiments which, as mentioned, handle data messages exchanged between the logical network DCNs and external network endpoints. These tier-0 logical routers may also have a DR as well as one or more SRs (e.g., SRs at each site spanned by the T0 logical router).

When a logical router has SRs in multiple sites, a separate SR is implemented on a separate host computer in each of the sites. Some embodiments designate one SR (i.e., one site) as the primary SR for each such logical router. In this case, many data messages sent from one site to another that require processing by the SR for a particular logical router are transmitted from their originating site to the site of the primary SR via the logical network gateways for a backplane logical switch that connects all of these SRs. In this case, the visualization of some embodiments displays a representation of the logical network gateways (i.e., of the RTEP channel) between the sections corresponding to these sites, in addition to showing the secondary and primary SRs in each of the sites that process the data message flow.

For example, a tracing operation data message flow sent from a source endpoint in a first site to a destination endpoint in a second site might be processed by a first logical switch to which the source endpoint connects, the DR of a first tier-1 logical router to which the first logical switch connects, the secondary SR of the first tier-1 logical router in the first site, the primary SR of the first tier-1 logical router in a third site (as well as the logical network gateways between these two SRs), the secondary SR of a tier-0 logical router in the third site, the primary SR of the tier-0 logical router in a fourth site (as well as the logical network gateways between these two SRs), the secondary SR of a second tier-1 logical router in the fourth site, the primary SR of the second tier-1 logical router in a fifth site (as well as the logical network gateways between these two SRs), the secondary SR of a second tier-1 logical router in the fifth site, the primary SR of the second tier-1 logical router in the second site (as well as the logical network gateways between these two SRs), the DR of the second tier-1 logical router in the second site, and a second logical switch to which the destination endpoint connects. Some embodiments display each logical switch, each set of logical network gateway (i.e., each RTEP channel between these logical network gateways), and each SR (both primary and secondary SRs) in the flow tracing visualization. It should be noted that many networks are configured such that the primary SRs for multiple logical routers are in the same site, so the data message flow does not have to pass through as many sites as in the above example. Other examples where the data message flow leaves one site and then comes back to that site are also possible, as described.

In some embodiments, each of the PFEs that implements the LFEs executes on a host computer at one of the sites. Specifically, in some embodiments the logical network gateways and SRs are implemented on edge devices (i.e., computing devices that handle the connections with external networks and between sites). These edge devices implement the distributed LFEs such as logical switches and DRs as well, which are also implemented by PFEs executing on the host computers. In some embodiments, the visualization provides an option for a user to view the physical computing device (e.g., edge devices, host computer) that implements each of the displayed LFEs that processes the data message flow.

When a data message flow passes through numerous sites, the visualization of the flow tracing operation can become crowded and difficult to follow because so many sections are required. In addition, an administrator may not be interested in viewing all of the different secondary and primary SRs that process the data message flow. As such, some embodiments present the sections for intermediate sites (i.e., any site that is not the first or last site through which a data message flow passes) as collapsible within the user interface. When the number of sites is above a threshold, some embodiments automatically display these sections as collapsed while providing a selectable item for expanding the section. Other embodiments do not automatically collapse any of the sections, but provide selectable items enabling collapse of each section. A collapsed section does not display any of the LFEs that process the data message flow at the corresponding site and is replaced in the visualization with the selectable expansion item. When expanded, a section displays its LFEs as normal. In addition, logical network gateways between collapsed and expanded sections are removed from the visualization in some embodiments.

The visualization of some embodiments can include additional details about the data message flow and the LFEs and physical elements that process the data message flow. In some embodiments, for example, a selectable option is provided to cause the visualization to display a number indicating the latency between sites. Additionally, or alternatively, the visualization provides a selectable option for displaying any alarms raised in the network. When selected, the visualization displays (e.g., by querying the network management system data store) indicators for any LFEs (or PFEs) on which alarms have been raised (e.g., by presenting the GUI items for these LFEs in a different color than the other LFEs).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for presenting a visualization of a data message flow within a logical network that is implemented across multiple sites (e.g., multiple federated datacenters in different locations). The method receives flow tracing data regarding a data message flow that is sent from a source endpoint in a first one of the sites to a destination endpoint in a second one of the sites (possibly flowing through other sites as well) and that is processed according to logical forwarding elements (LFEs) implemented in at least the first and second sites. The method identifies the LFEs that process the data message flow in each site through which the data message flow passes and presents a visualization for the data message flow that includes a separate section for each of these sites. Each of these sections indicates the LFEs that process the data message flow in the corresponding site.

Figure 1:
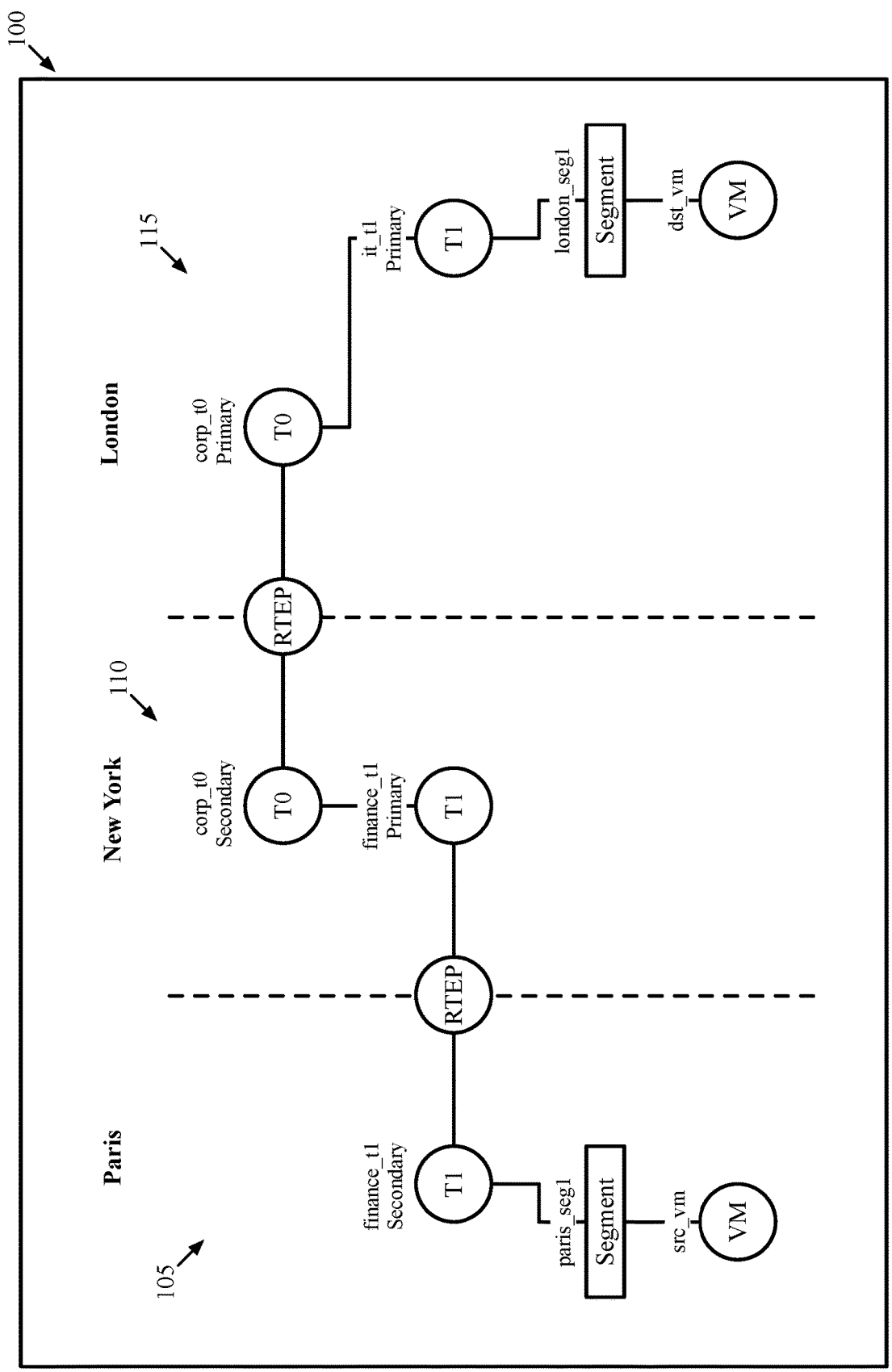
FIG. 1 illustrates a graphical user interface that includes such a visualization of a flow tracing operation according to some embodiments.

FIG. 1 illustrates a graphical user interface that includes such a visualization 100 of a flow tracing operation according to some embodiments. In this example, the data message flow that is simulated by the flow tracing operation has a source endpoint as a virtual machine (VM) connected to a logical switch (represented as a segment) in a Paris datacenter, passes through a New York datacenter, and has a destination endpoint that is a VM connected to a logical switch in a London datacenter. Each of these sites (Paris, New York, and London) are given corresponding vertical sections 105-115 in the visualization 100, with the sections separated by dashed vertical lines.

Within each of the sections 105-115, the visualization 100 displays UI items representing LFEs that process the data message flow within the corresponding site. As shown, the data message flow (i.e., data messages belonging to the data message flow) is sent from the source VM (named "src_vm") and is initially processed by a logical switch ("paris_seg1"). This processing typically occurs at a physical forwarding element (PFE) set (e.g., a set of virtual switches and/or virtual routers), executing on the same host computer as the source VM, and identifies that the packet is logically forwarded to a tier-1 (T1) logical router ("finance_t1"). The PFE set at the host also implements a distributed router (DR) of the T1 logical router, which in this case routes the data message flow to a centralized component of the T1 logical router implemented on an edge computing device in the same site. As described further below, in some embodiments when a logical router spans multiple sites, these centralized router (also called service routers, or SRs) are implemented in each of the spanned sites and one of the sites (and therefore one of the SRs) is designated as a primary SR, with all of the others designated as secondary SRs.

The primary SR for the T1 logical router "finance_t1" is located in the New York site, so the data message flow is routed to this primary SR via a tunnel between logical network gateways (also referred to as remote tunnel endpoints, or RTEPs). The visualization 100 displays indicators for the secondary SR in the Paris section 105, the primary SR in the New York section 110, and for the RTEP channel on the boundary between these two sections. These RTEP channels are shown using a single indicator in some embodiments, though they are each implemented as separate logical network gateways in each site (usually on the same edge device as the SRs that they connect).

Within the New York site, the primary T1 SR routes the data message flow to a tier-0 (T0) logical router ("corp_t0"). As with the T1 SR, the T0 SR in some embodiments includes a DR and a set of SRs (with a primary SR in one site and secondary SRs in other sites). Here, the primary SR of the T0 logical router is located at the London site, so the data message flow is routed from the secondary T0 SR in the New York site to the primary T0 in the London site, again via a tunnel between logical network gateways. The visualization 100 again includes indicators for the secondary T0 SR in the New York section 110, for the primary T0 SR in the London section 115, and for the RTEP which is shown on the boundary between these two sections.

The T0 router routes the data message flow to a different T1 logical router ("it_t1"), which also has its primary SR located at the London site. An indicator for the primary SR of this T1 is shown within the London section 100 of the visualization 100. This T1 logical router routes the data message flow to a logical switch ("london_seg1") at the same London site, so this switch is shown in the visualization 100 as well. Finally, the logical switch forwards the data message flow to the destination VM ("dst_vm"), which executes on a host computer also located at the London site. It should be noted that the flow tracing operation data messages would not actually be delivered to the destination VM by the PFE set at this host computer (because they are flow tracing operation messages that do not need to be processed by the VM). Further description of the processing of data messages for logical networks that span multiple sites can be found in U.S. patent application Ser. No. 16/906,891, filed Jun. 19, 2020, now issued as U.S. Pat. No. 11,394,634, which is incorporated herein by reference.

In the example visualization 100, each of the LFEs shown is indicated by a shape (e.g., circle for logical routers and logical network gateways, rectangles for the logical switches) with lines connecting the segments and the order of processing moving from left to right as well as bottom to top and then back to bottom. It should be understood that this example as well as the various other example visualizations presented in this document are merely examples and that different embodiments may include different variations on these visualizations (e.g., different shapes to represent LFEs, description text inside the UI item representing an LFE rather than outside the UI item, different colors for different types of LFEs, etc.).

Figure 2:
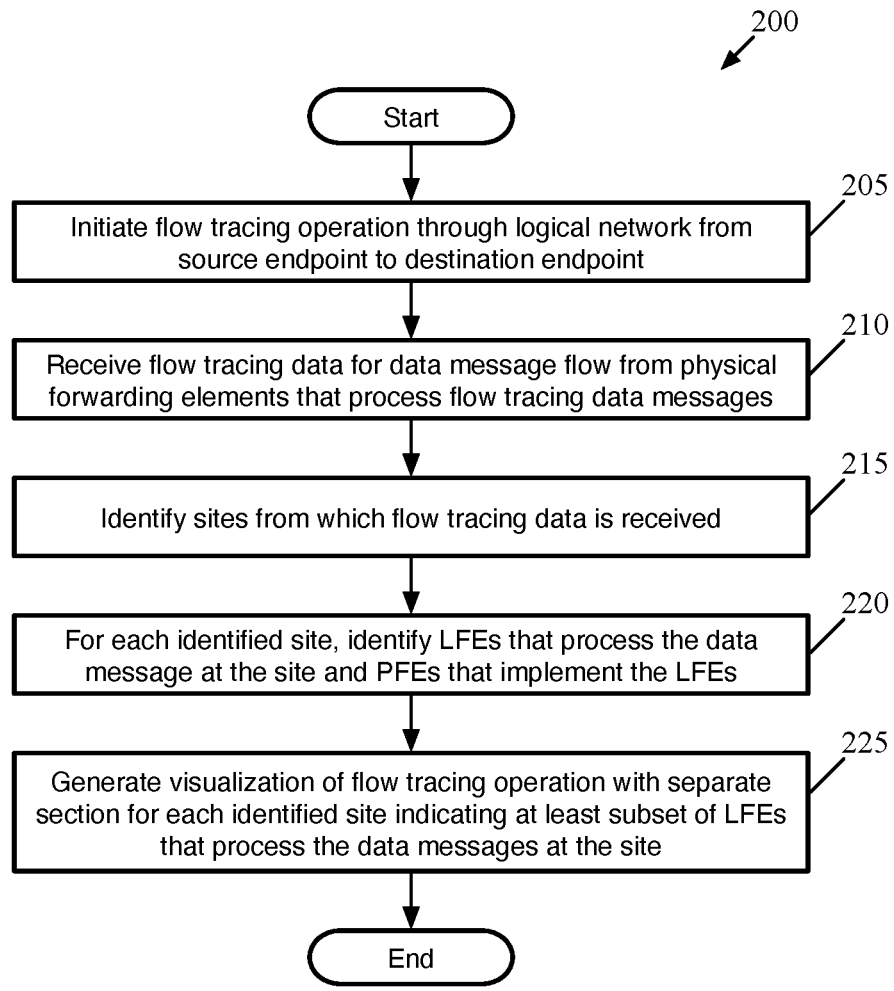
FIG. 2 conceptually illustrates a process of some embodiments for performing a flow tracing operation and generating a visualization of that operation to present to a user.

FIG. 2 conceptually illustrates a process 200 of some embodiments for performing a flow tracing operation and generating a visualization of that operation to present to a user. In some embodiments, the method is performed by a network manager, network controller, or other component of a network management and control system. In different embodiments, a single network manager, a cluster of network managers, or other set of components may perform the operations of the process 200. For instance, in some embodiments a network manager initiates the flow tracing operation while a separate visualization component of the network management and control system performs other operations to generate a visualization of the flow tracing operation.

As shown, the process 200 begins by initiating (at 205) a flow tracing operation through a logical network from a source endpoint to a destination endpoint. In some embodiments, a user of the network management and control system specifies (e.g., through a graphical user interface) for the flow tracing operation to be performed and specifies source and destination endpoints for the operation. In some embodiments, the source and destination endpoints are data compute nodes (e.g., VMs, containers, bare metal computing devices, etc.) in the logical network managed by the network management and control system. These source and destination endpoints may be located at the same site or different sites when the logical network spans multiple sites.

The network management and control system is also responsible for injecting flow tracing data messages at the source endpoint which are addressed to the destination endpoint as though the source endpoint had actually sent the data messages. These data messages are also marked with a flag (e.g., a single bit) that indicates that they are generated for the flow tracing operation. In some embodiments, this flag causes (i) PFEs that process the data messages to provide flow tracing data to the network management and control system and (ii) the PFE connected to the destination endpoint to process the data message but not actually deliver the data message to the destination endpoint. The flow tracing operations of some embodiments are described in greater detail in U.S. Pat. Nos. 9,197,529 and 10,805,239, both of which are incorporated herein by reference.

As a result of initiating the flow tracing operation, the process 200 receives (at 210) flow tracing data for the data message flow from PFEs that process the flow tracing operation data messages. These PFEs (e.g., software and/or hardware forwarding elements, such as edge devices as well as virtual switches and virtual routers executing on host computers) are configured by the network management and control system to send flow tracing data to a central controller or controller cluster at their respective site (e.g., directly, or via local controllers that execute on host computers alongside the PFEs). The flag bit used to mark the flow tracing operation data messages specifies for the PFEs to send flow tracing data in response to processing these data messages.

The PFEs, in some embodiments, send the flow tracing data to the controllers as control messages that indicate that the forwarding element has performed a specific action or actions. These actions can include physical receipt of a data message at a particular port, ingress of a packet to an LFE, logical forwarding of a data message according to an LFE, application of a firewall, access control, or other rule for an LFE to a data message, physical forwarding (e.g., encapsulation and output) of a data message, dropping a data message, delivery of a data message to its destination, etc. The controllers and/or network managers at each site aggregate the flow tracing data for a particular flow tracing operation and pass this data to a centralized controller and/or manager cluster in some embodiments (e.g., the network manager cluster that generates the visualization of the flow tracing operation). The centralized controller and/or manager cluster is thus able to use the data from all of the sites to generate the visualization of the processing of the data message flow across the multiple sites. Description of a multi-site network management and control system can be found in U.S. patent application Ser. No. 16/906,925, filed Jun. 19, 2020, now published as U.S. Patent Publication 2021/0314212, which is incorporated herein by reference.

The process 200 then identifies (at 215) the sites from which flow tracing data was received. As mentioned, in some embodiments, the network managers and/or controllers at the sites provide flow tracing data to a centralized component of the network management and control system that generates a visualization of the flow tracing operation to provide to the user that requested the operation. Based on which sites provide flow tracing data, this central component can determine the sites that will be included in the visualization.

For each of these identified sites, the process 200 identifies (at 220) the LFEs that process the data messages at the site and the PFEs that implement these LFEs. In some embodiments, when a PFE provides flow tracing data for a particular operation, that operation specifies at least (i) the PFE and (ii) the LFE associated with the operation, if one exists (e.g., for a logical forwarding operation). Thus, when a PFE executing on the source host computer (i.e., the host computer at which the source endpoint executes) implements a logical switch by logically forwarding a data message to a logical router, that information is provided in a flow tracing control message. When the PFE encapsulates the data message to send the data message to an edge node at which the next hop SR executes, that information is also included in another flow tracing control message (or the same control message, for embodiments in which all of the operations are included in a single message from the PFE). Similarly, when an edge node performs logical routing for a particular SR, tunnels a data message to another site via an RTEP, performs logical switching, etc., this information is conveyed via flow tracing control messages.

Finally, the process 200 generates (at 225) a visualization of the flow tracing operation with a separate section for each identified site that indicates at least a subset of the LFEs that process the data messages at the site. This visualization is provided to the user within a graphical user interface (e.g., of a network management application). The process 200 then ends. In some embodiments, as shown in FIG. 1, these sections are presented as vertical segments of the visualization display, with the section corresponding to the source site (i.e., the site at which the source endpoint is located) on one side and the section corresponding to the destination site (i.e., the site at which the destination endpoint is located) on the other side of the display. For instance, all of the examples shown in this application have the section corresponding to the source site on the left side of the display. If the destination site is different than the source site, these examples show the source site on the right side of the display.

Figure 3:
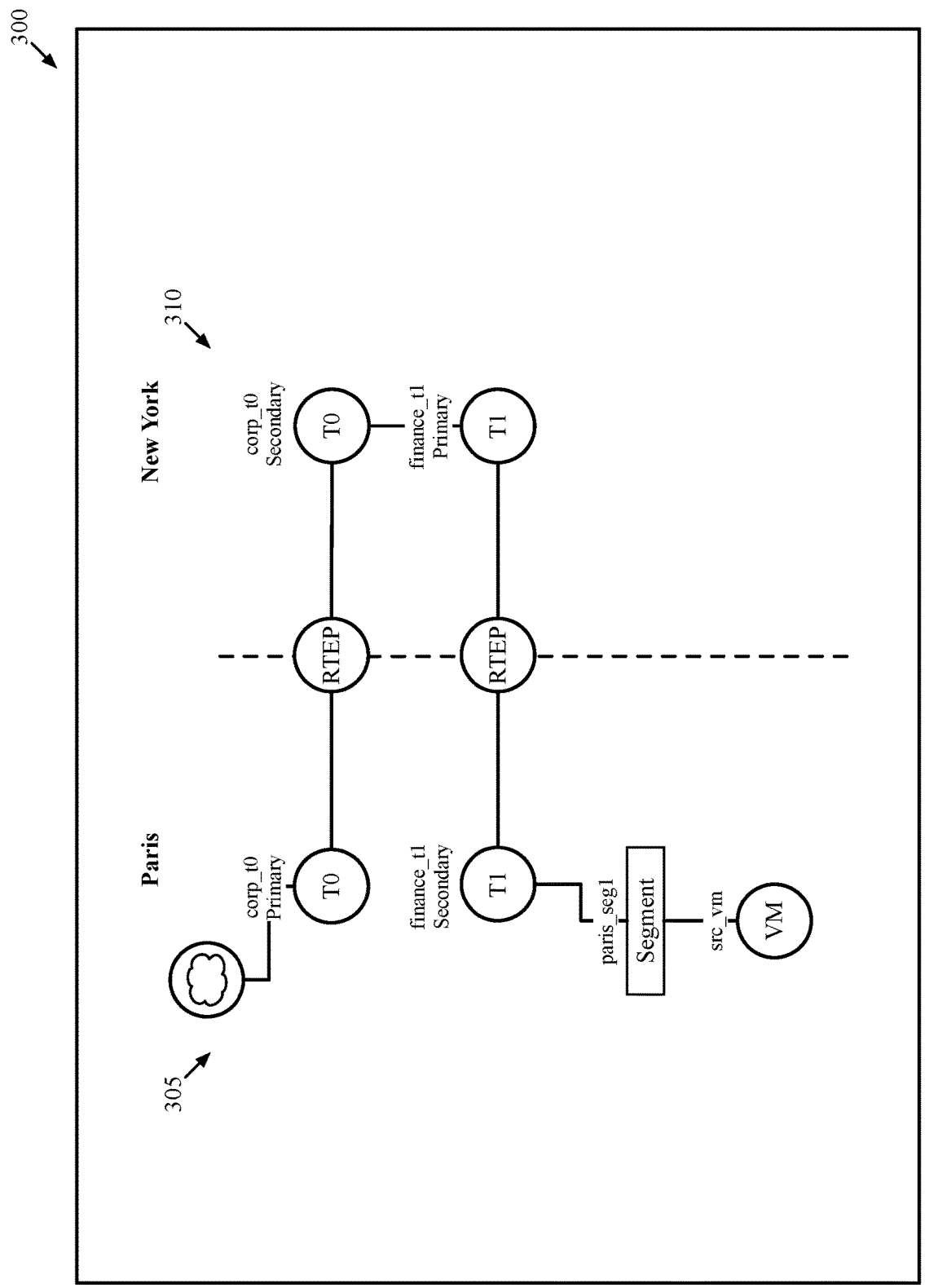
FIG. 3 shows a visualization 300 for a flow tracing operation in which data messages are sent from a first site to a second site and back to the first site in order to exit the network.

FIG. 3, however, shows a visualization 300 for a flow tracing operation in which data messages are sent from a first site to a second site and back to the first site in order to exit the network. In this case, the source endpoint is displayed in the bottom left (within a first section 305) and the visualization 300 shows the flow traveling from bottom to top, including left to right (to a second section 310) and then back to the left to the first section 305. As shown here, the source endpoint is a VM ("src_vm") and the destination endpoint is an address (e.g., an IP address) external to the logical network. Similar to the flow shown in FIG. 1, the PFE set at the host computer of the source VM performs processing for a logical switch ("paris_seg1") for the data messages, which is shown in the visualization 300.

This logical switch logically forwards the data message flow to the T1 logical router "finance_t1", for which Paris is a secondary site. As such, after the data message flow is tunneled to the edge device implementing the T1 SR within the Paris site, this secondary T1 SR routes the data message to the primary T1 SR (and sends this data message via the tunnel between logical network gateways for the backplane logical switch connecting these SRs), which is located in the New York site. As such, the visualization 300 shows the data message flow being sent via an RTEP to the primary T1, for which the GUI item is displayed in the New York section 310. Because the destination network address of these data messages is an external address, the T1 SR routes the data messages to the T0 SR ("corp_t0"), for which the New York site is a secondary site. This secondary T0 SR could be implemented on the same edge device as the primary T1 SR or a different edge device. In either case, the secondary T0 SR routes the data message flow to the primary T0 SR, which in this case is located at the Paris site.

Thus, rather than continuing to show the data message flow trending rightward, the visualization 300 displays the flow going back to the Paris section 305 (to a primary T0 SR, via the tunnel between logical network gateways for connecting these T0 SRs). Finally, within this section 305, the visualization displays a cloud icon to indicate that the data message flow is sent to external networks. While this example shows a single section 305 corresponding to the Paris site, other embodiments display multiple separate sections for a site through which the data message flow passes multiple times. In some such embodiments, a second section corresponding to the Paris site would be displayed to the right of the New York section 310, and would include the UI items for the primary T0 SR as well as the external network cloud icon. Some embodiments also use arrows to indicate the direction of the flow, which can be useful for such a flow.

As noted, some embodiments do not display all of the LFEs that process a data message flow in the visualization for that flow. In some embodiments, only user-configured LFEs are shown in the visualization. These include logical switches to which network endpoints connect, logical routers, and RTEPs. However, the internal logical components of a logical router are not shown in some embodiments (i.e., the DR and SR are not differentiated, and neither the logical switch that connects these components nor the backplane logical switch that connects SRs across sites are indicated except as an RTEP). As described above by reference to FIG. 1, in some embodiments the visualization shows the connections between the components, includes the names of these LFEs (e.g., paris_seg1, finance_t1, etc.), and for logical routers that span multiple sites, indicates whether each site is the primary or secondary site for that logical router. Other embodiments might include additional information as well.

When a segment is stretched between sites and the source and destination endpoints are both connected to that segment, data messages are sent across sites via logical network gateways and the tunnel between these logical network gateways (the RTEP channel). Whereas the logical network gateways for a backplane logical switch between SRs of the same logical router are typically implemented as tunnel endpoints (RTEPs) on the same edge devices as the SRs, the logical network gateways for stretched logical switches are implemented as RTEPs on edge devices separate from the host computers that implement the logical switches for these data messages. Thus, rather than tunnel a data message directly from the source host computer at the source site to the destination host computer at the destination site, some such embodiments tunnel the data message from the source host computer to the edge device at the source site implementing the logical network gateway for the logical switch, which in turn tunnels the data message to the edge device at the destination site implementing the logical network gateway for the logical switch (via the RTEP channel between the sites), which then tunnels the data message to the destination host computer.

Figure 4:
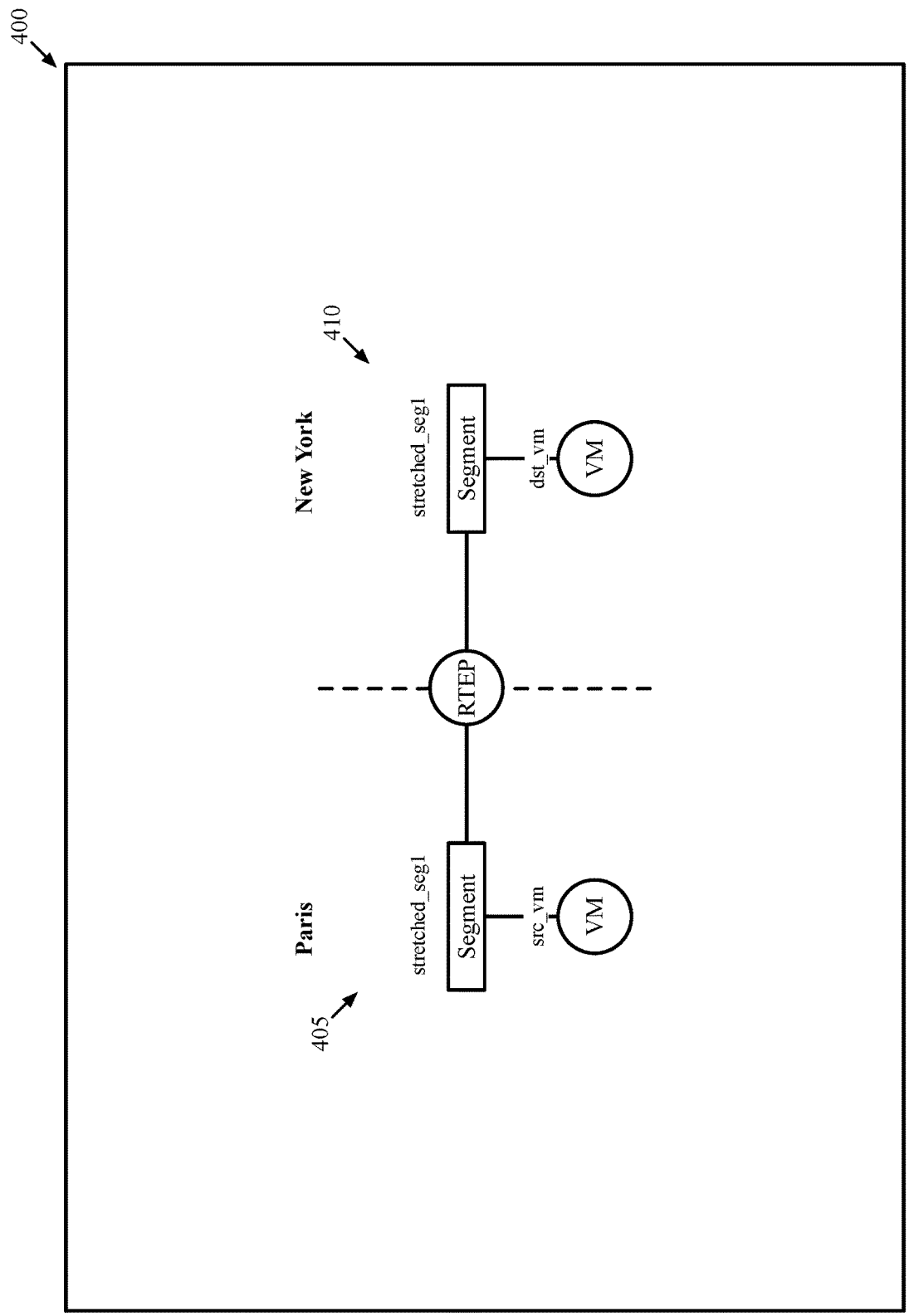
FIG. 4 illustrates a visualization of a flow tracing operation for a data message flow in which the source and destination endpoints connect to the same logical switch at different sites.

FIG. 4 illustrates a visualization 400 of a flow tracing operation for such a data message flow in which the source and destination endpoints connect to the same logical switch at different sites. As shown, two separate UI items are displayed for the logical switch ("stretched_seg1"), one in each of the sections 405 (for the Paris site) and 410 (for the New York site). In addition, an RTEP item is displayed on the boundary for the logical network gateways that process the data message. In other embodiments, because the logical network gateways are implemented on separate devices, two different items are shown on either side of the section boundary.

As described above, each LFE displayed in the flow tracing operation visualization is implemented by a PFE. While many of the LFEs are actually each implemented by many different PFEs at one or more sites, in the course of processing the data message flow each LFE as represented in the visualization is typically processed by one PFE (or possibly two PFEs). For example, a logical switch to which a source endpoint for a data message flow connects will typically be implemented (in the context of processing the data message flow) by the PFE set at the host computer on which the source endpoint executes. This PFE set also typically implements the logical router (i.e., the DR of the logical router) to which the logical switch connects, but if the data message flow is sent to an SR, then the edge device that implements the SR also implements the logical router.

In general, the logical network gateways and SRs are implemented on edge devices, while the logical switches shown in the flow tracing operation visualizations are implemented by the edge devices as well as the PFE sets executing on the source and/or destination endpoint host computers. In some embodiments, the visualization provides an option for a user to view the physical computing device (e.g., edge devices, host computers) that implements each of the displayed LFEs that processes the data message flow.

Figure 5:
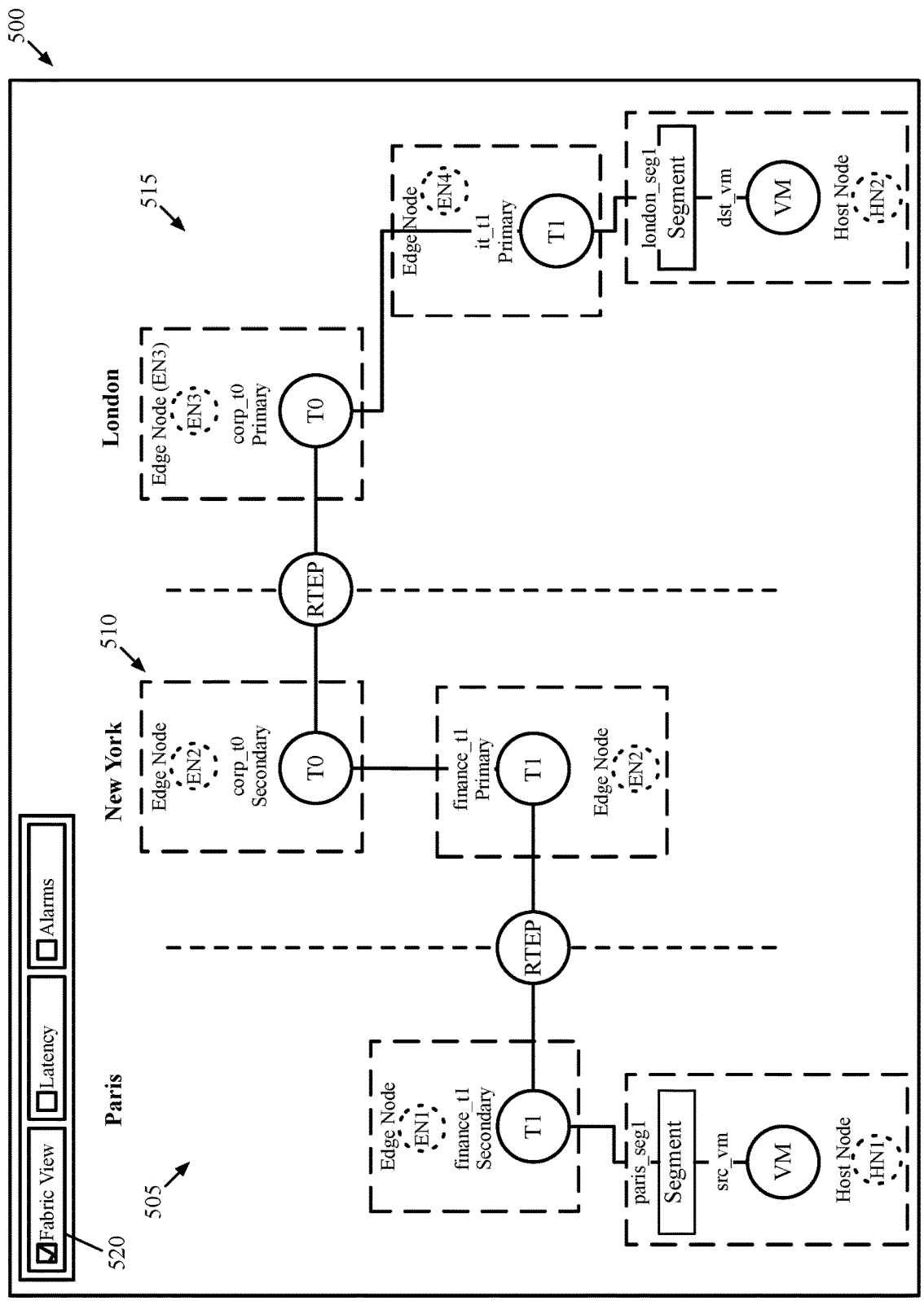
FIG. 5 illustrates a flow tracing operation visualization with an option selected to view the physical computing devices implementing each displayed LFE in the course of processing the flow tracing operation data messages.

FIG. 5 illustrates a flow tracing operation visualization 500 with an option 520 selected to view the physical computing devices (e.g., edge devices, host computers that execute PFE sets) implementing each displayed LFE in the course of processing the flow tracing operation data messages. In some embodiments, this option is referred to as a "Fabric View" and is displayed along with the flow visualization as a selectable item that enables turning on or off the display of the physical devices. In other embodiments, the option may alternatively or conjunctively be selectable through a drop-down menu, keyboard shortcuts, etc., and may be referred to by other names.

As shown in the figure, some embodiments display the physical devices using a dashed line (as opposed to the straight lines used to represent the LFEs) or use a different mechanism to differentiate the physical devices from the LFEs (e.g., different colors, different fonts for the names, etc.). The display also shows the type of physical device (e.g., either host node or edge node) as well as the name for the physical device in the network management and control system (e.g., HN1, EN2, etc.). In addition, as shown in the figure, some embodiments display the name of the physical device within a selectable item (in this case, a dotted line circle). This selectable item (i.e., the items showing "HN1", "EN1", etc.) is selectable in some embodiments to view additional details about that physical device (e.g., the type of computing device, the group of computing devices to which it belongs, etc.). It should be understood that different embodiments display such selectable items for the physical devices in different manners (e.g., with or without the device name, as solid shaded shapes rather than dotted or dashed lines, etc.).

The visualization 500 shows a data message flow following the same path as in FIG. 1, but with the physical device view option 520 selected. In the first section 505 (for the Paris site) the source VM and initial logical switch are shown as associated with a host computer HN1. For the logical routers, some embodiments display edge nodes for each SR that processes the data message flow (i.e., ignoring that the DRs are often implemented elsewhere, such as the host computer HN1). Thus, a first edge node EN1 is displayed for the secondary SR of the T1 logical router "finance_t1" within the Paris section 505 while a second edge node EN2 is shown for the primary SR of this logical router within the New York section 510.

In this case, the edge node EN2 also implements the secondary SR for the T0 logical router "corp_t0" within the New York site. As in this example, some embodiments display two separate indicators for the same edge node when this occurs. However, other embodiments display a single indicator for an edge node when two consecutive SRs are implemented on the same edge node (e.g., an indicator that encompasses both of the SRs). Within the section 515 corresponding to the London site, two edge nodes EN3 and EN4 are displayed for the two SRs that process the packet at this site.

In addition, although the logical forwarding operations of the logical switch "london_seg1" are performed at the edge node EN4 for this data message flow, the UI item for the logical switch is displayed within the UI item for the destination host computer HN2 (the PFE set executing at this host computer does perform additional logical processing to deliver the data message to the destination endpoint "dst_vm"). Different embodiments, however, display the logical switch UI item within the indicator for the edge device EN4, as two separate UI items within both of the physical device indicators, or as a single item on the boundaries of these two physical device indicators. While the example shows the UI items representing the physical devices as encompassing the UI items representing the LFEs, other embodiments instead display indicators for the physical devices that abut the corresponding LFEs. It should be understood that many variations on the display shown in FIG. 5 are possible in different embodiments.

When a data message flow passes through numerous sites, the visualization of the flow tracing operation can become crowded and difficult to follow because so many sections are required. In addition, an administrator may not be interested in viewing all of the different secondary and primary SRs that process the data message flow. As such, some embodiments present the sections for intermediate sites (i.e., any site that is not the first or last site through which a data message flow passes) as collapsible within the user interface.

Figure 6:
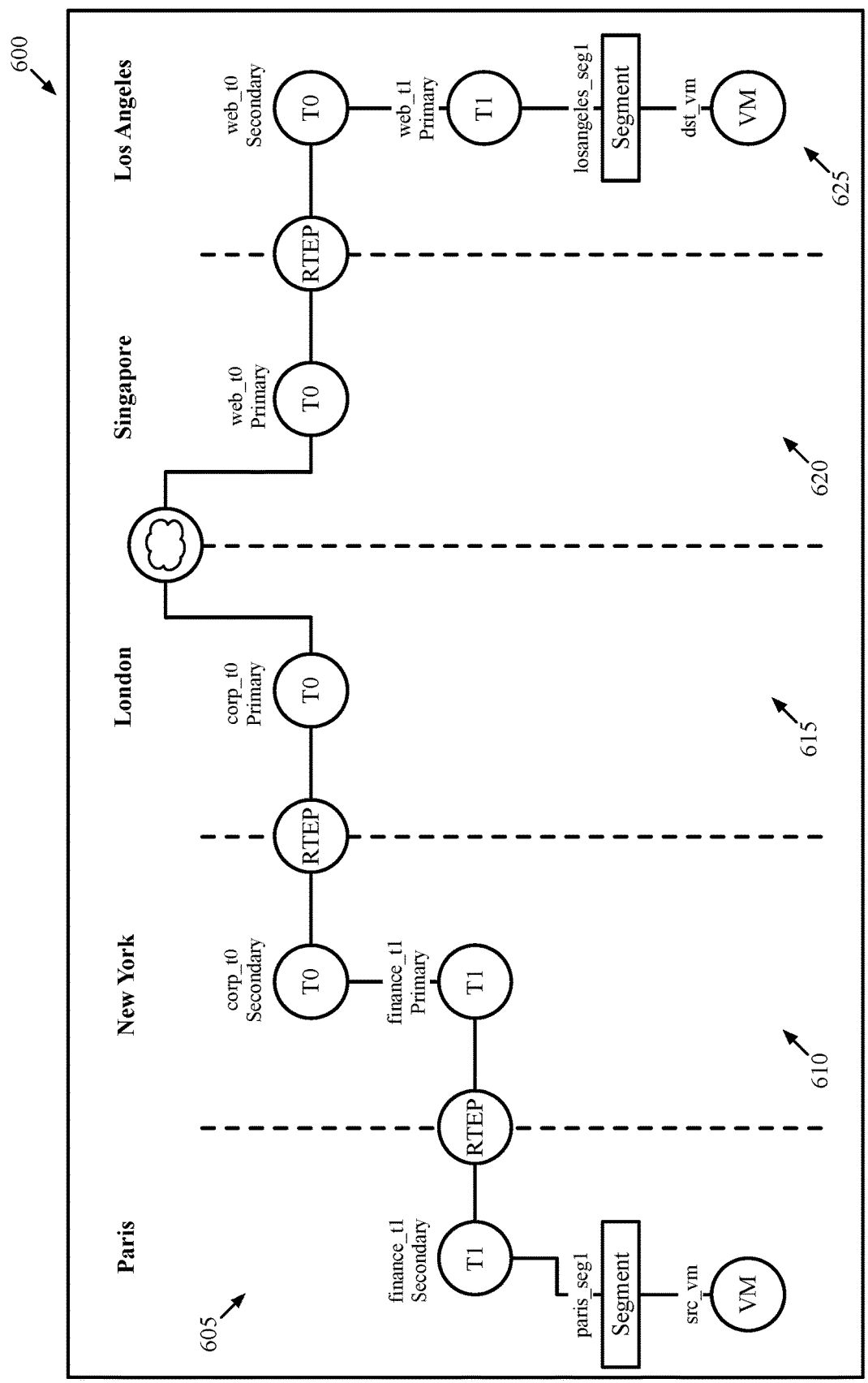
FIG. 6 illustrates a visualization of a flow tracing operation for a data message flow that passes through five different sites and thus includes five sections.

FIG. 6 illustrates a visualization 600 of a flow tracing operation for a data message flow that passes through five different sites and thus includes five sections 605-625. Here, the data message flow is sent from a source VM ("src_vm") to a logical switch ("paris_seg1") to a first T1 logical router ("finance_t1") to a first T0 logical router ("corp_t0"). The visualization for these LFEs spans three sections 605-615. The primary T0 SR located in the London site forwards the data message to an external network, through which the data message is delivered to a primary SR for another T0 logical router ("web_t0") at a Singapore site that is also managed by the network management and control system (which therefore receives flow tracing operation data from the edge device implementing the T0 SR). This external network is represented by a cloud icon displayed between the sections 615 and 620 corresponding to the London and Singapore sites, respectively. From here, the data message flow is sent to the Los Angeles site, where it is processed by a secondary T0 SR, the primary SR for a second T1 logical router ("web_t1"), a second logical switch ("losangeles_seg1"), and would be delivered to the destination VM ("dst_vm") if the flow were not for a flow tracing operation.

Figure 7:
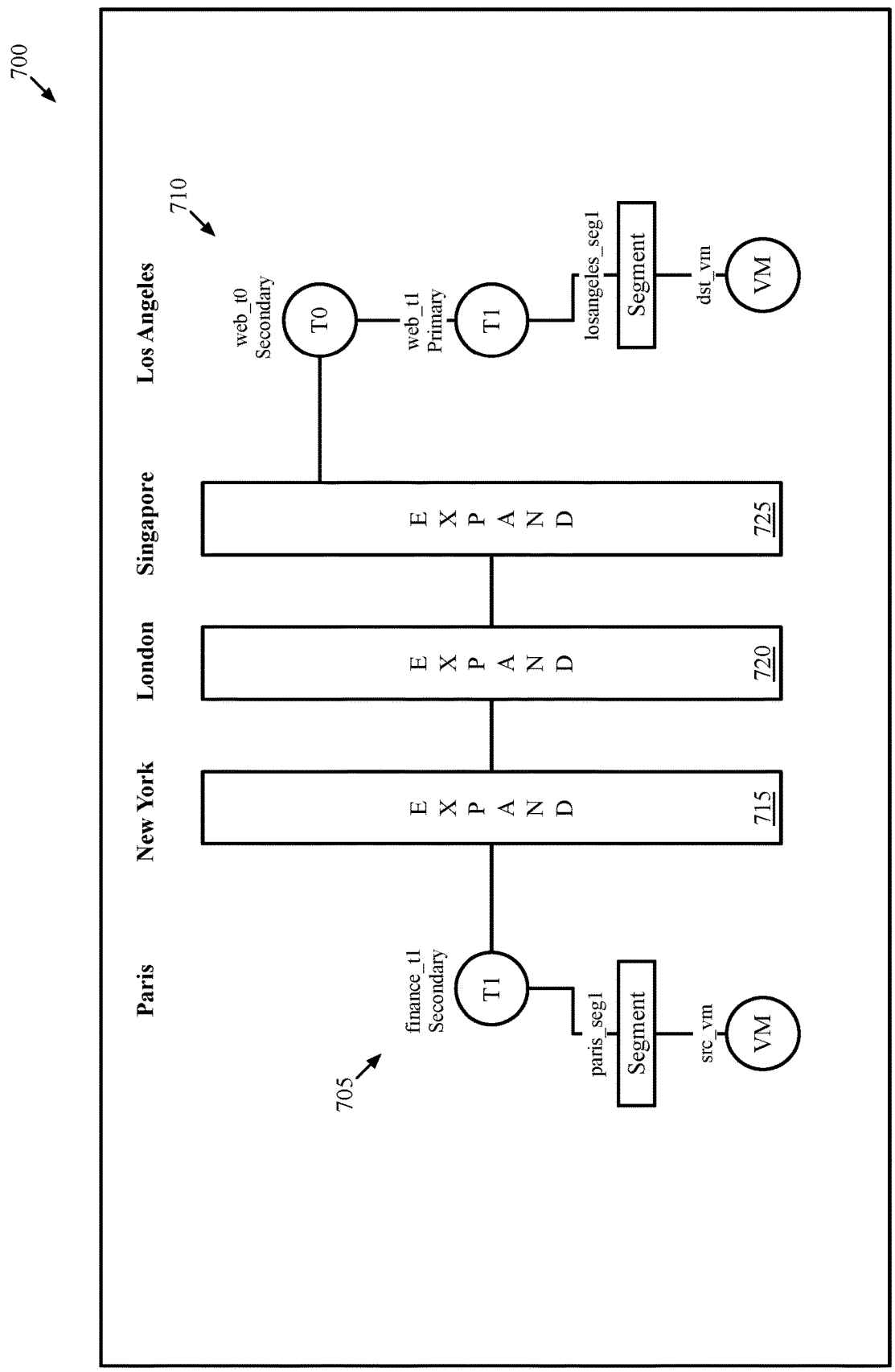
FIG. 7 illustrates a visualization of a flow tracing operation for a data message flow that passes through five different sites (similar to that shown in FIG. 6) but with the intermediate sections collapsed.

In this example, each of these sections is fully displayed. However, when the number of sites is above a threshold (e.g., more than four sites, more than five sites, etc.), some embodiments automatically display some of the sections as collapsed while providing a selectable item for expanding the section. FIG. 7 illustrates a visualization 700 of a flow tracing operation for a data message flow that passes through five different sites (similar to that shown in FIG. 6) but with the intermediate sections collapsed. In this case, the sections 705 and 710 corresponding to the source (Paris) and destination (Los Angeles) sites are displayed in full with the LFE indicators shown. For the intermediate New York, London, and Singapore sites, however, the visualization 700 displays only expandable UI items 715-725 along with header text specifying the site locations. This significantly reduces the clutter displayed within the visualization 700.

In some embodiments, as shown, vertical dashed lines (or similar items used to separate sections of the visualization) are not displayed between expanded sections and collapsed sections. Rather, lines are used to indicate that the flow passes from one of the LFEs in the expanded section (e.g., the primary T1 SR in the Paris section 705) to the site represented by the collapsed section. In some embodiments, these lines are always shown in the middle of the visualization. In other embodiments, as with the line passing from the UI item 725 to the secondary T0 SR item in the Los Angeles section 710, these lines are displayed so as to connect to the previous/next LFE in the flow.

Figure 8:
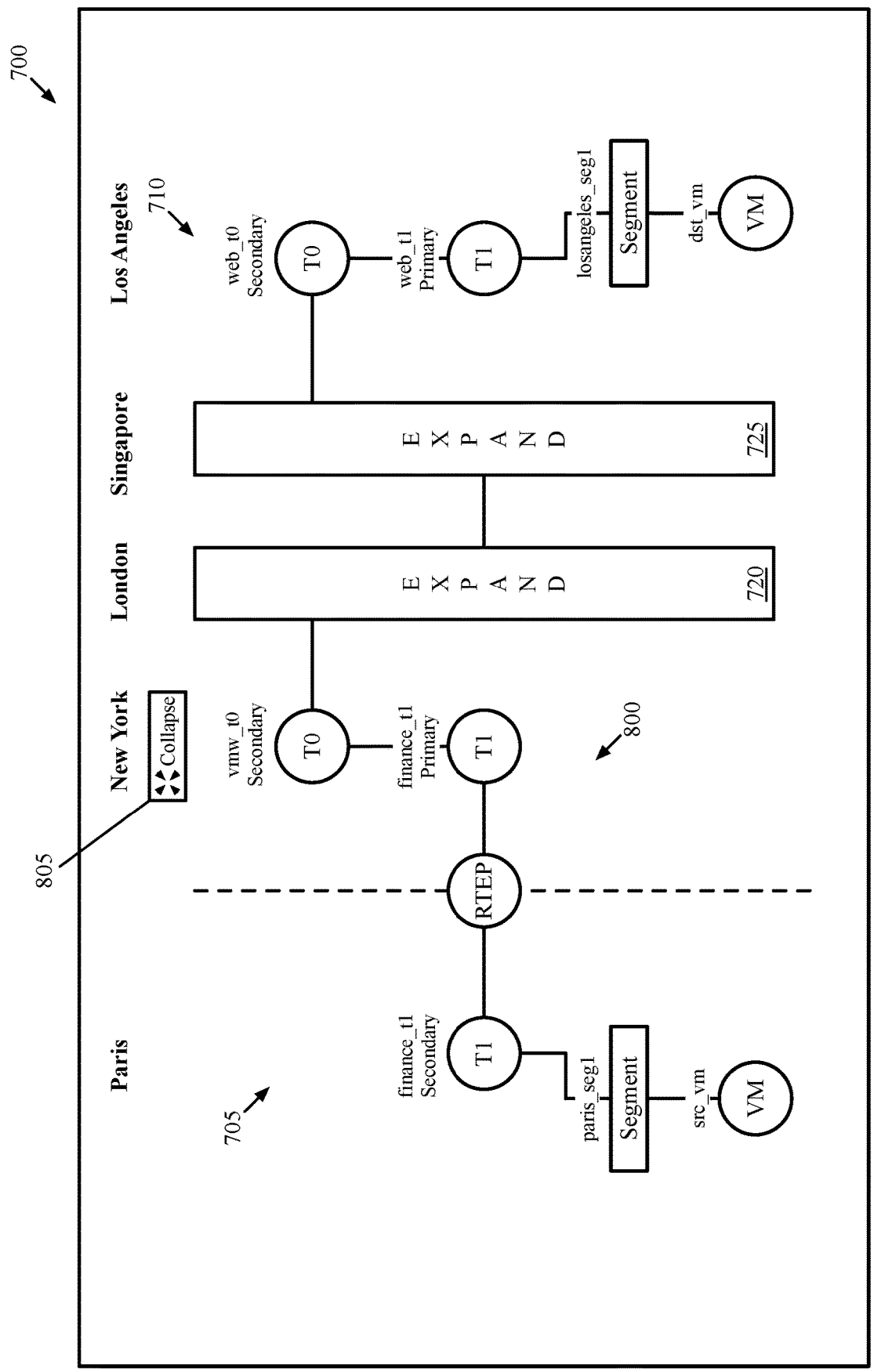
FIG. 8 illustrates the flow tracing operation visualization of FIG. 7 after one of the sections has been expanded.

When a user selects one of the expandable UI items, the visualization is modified to display the corresponding section with the LFEs and their connections. FIG. 8 illustrates the flow tracing operation visualization 700 of FIG. 7 after one of the sections has been expanded. Specifically, a user has selected the expandable item 715 such that the section 800 is now displayed for the New York site, showing UI items for the primary SR of the T1 logical router "finance_t1" as well as the secondary SR of the T0 logical router "vmw_t0". In addition, the RTEP item for the logical network gateways connecting the two SRs of the T1 logical router is now shown on the boundary between the sections 705 and 800. Above the section 800 the visualization also displays a selectable UI item 805 that enables the user to collapse this section 800 (i.e., back into the expandable item 715). Other embodiments do not automatically collapse any of the sections in the initial display of the flow tracing operation, but instead provide selectable items that enable collapse of each section (or each intermediate section), such as the item 805.

Figure 9:
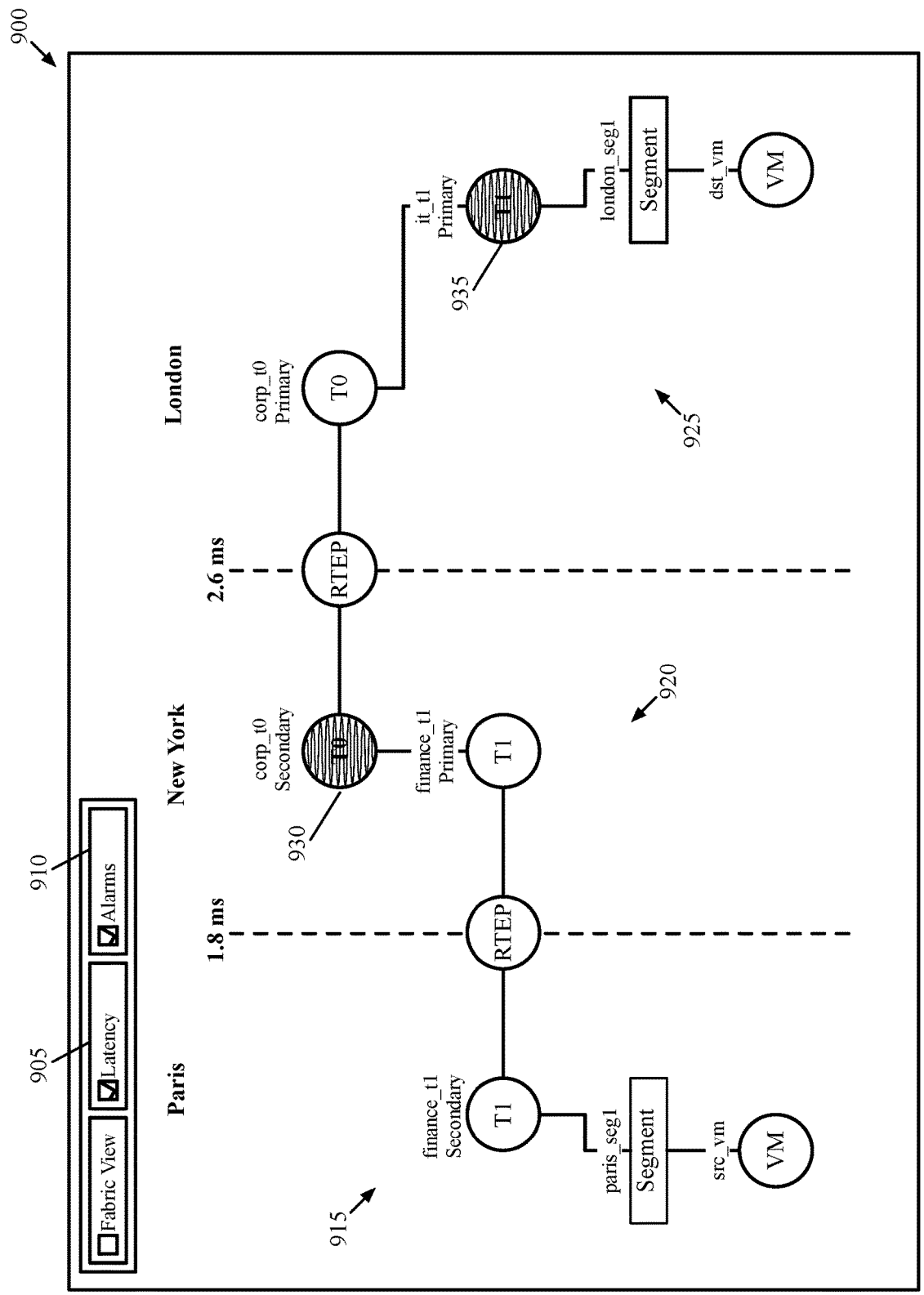
FIG. 9 illustrates a visualization of a flow tracing operation in which a user has selected options for the visualization to include (i) information indicating the latency between datacenters and (ii) indications as to which LFEs currently have alarms raised.

The flow tracing operation visualizations of some embodiments can include additional details about the data message flow and the LFEs and physical elements that process the data message flow, either as part of the standard display or as options for a user to select. FIG. 9 illustrates a visualization 900 of a flow tracing operation in which a user has selected options for the visualization to include (i) information indicating the latency between datacenters and (ii) indications as to which LFEs currently have alarms raised. These appear in the user interface as selectable items 905 and 910, which are currently shown as selected.

The selectable item 905 causes the display of latency information between the sections of the visualization 900. The visualization 900, in this example, is the same flow tracing operation as that shown in FIG. 1, with three sections 915-925 corresponding to three sites (Paris, New York, and London, respectively) through which the data message flow passes. The latency information shown in the visualization indicates the time that the data messages take to be sent from one site to another. In some embodiments, this information is based on timestamps in the control messages sent by the PFEs implementing the logical network gateways in each site that send the data messages between the sites. Here, the information shows latency of 1.8 ms between Paris and New York and 2.6 ms between New York and London. When the flow tracing operation involves sending multiple data messages, the latency information may be a mean latency, median latency, maximum latency, or other measurement.

The selectable item 910 causes the display of alarm information in the visualization 900. In this case, two LFEs have alarms raised: the secondary SR at the New York site for the T0 logical router "corp_t0" and the primary SR at the London site for the T1 logical router "it_t1". The UI items 930 and 935 for these LFEs are displayed in a different manner than the other LFEs so as to highlight that alarms are raised for the LFEs. In different embodiments, the presence of raised alarms may be shown by bolding or otherwise changing the font used within the UI items, changing the color, saturation, or other display characteristics of the UI items, making the UI items larger, etc. Alarms, in some embodiments, are events that the network management and control system detects and raises to indicate that the performance and system operation of a component (e.g., an LFE, PFE, etc.) is potentially affected. For instance, an edge device could be experiencing unusually high CPU usage or low available disk space, which could raise alarms on the physical edge device as well as the SRs implemented by that edge device. In some embodiments, the UI items indicating alarms raised are also selectable to provide information about the number of alarms raised, the types of alarms raised, etc.

Figure 10:
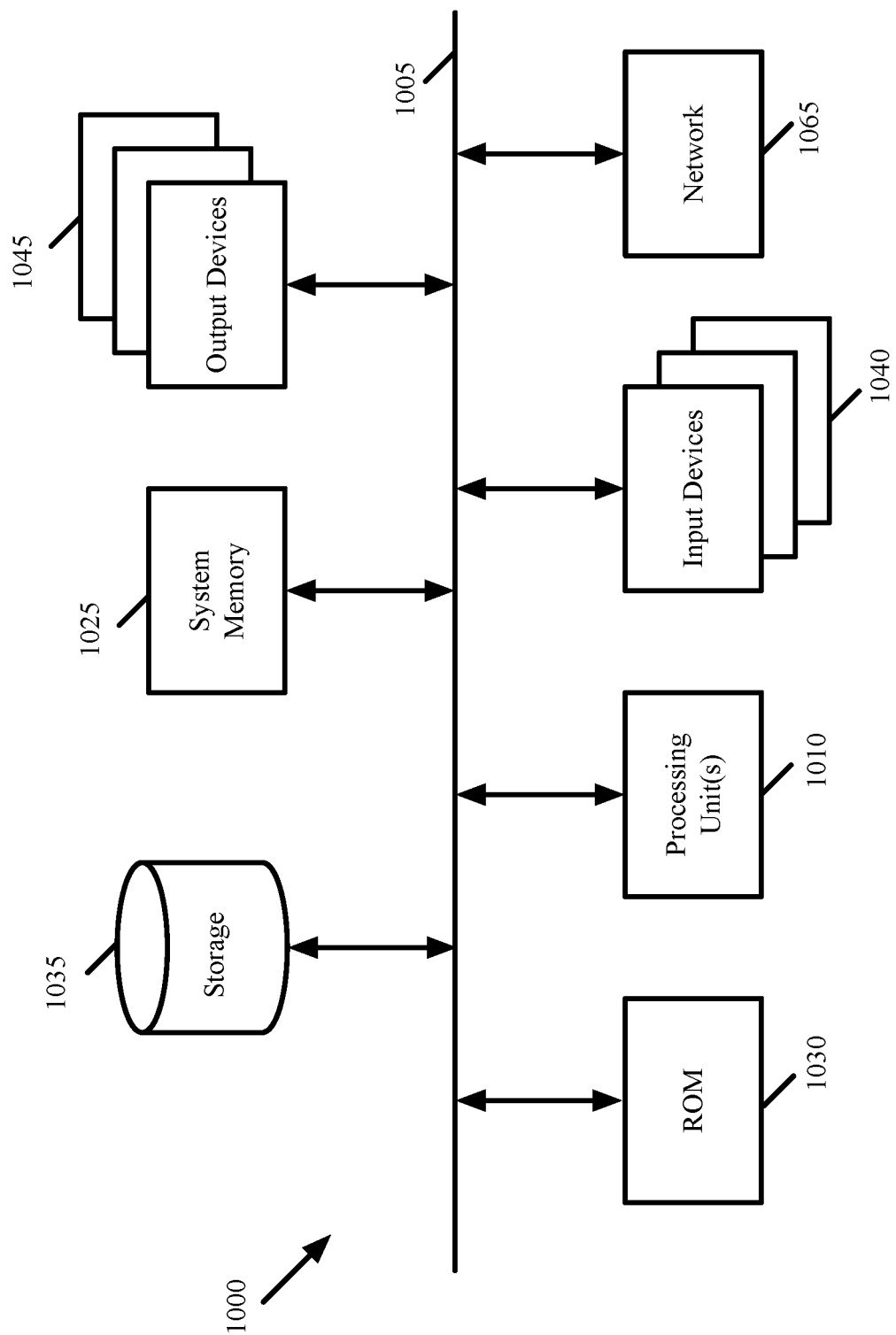
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random-access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 2) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for presenting a visualization of a data message flow within a logical network that is implemented across a plurality of sites including a first site and a second site, the method comprising:

receiving flow tracing data regarding the data message flow from a source endpoint in the first site to a second endpoint in the second site, the data message flow processed according to logical forwarding elements (LFEs) implemented in at least the first and second sites, the LFEs comprising logical routers;

for each of a set of sites including the first and second sites through which the data message flow passes, identifying the LFEs that process the data message flow in the site including a particular logical router implemented as a distributed router and a set of at least two centralized routers, each respective centralized router implemented in a different respective site; and presenting a visualization for the data message flow, the visualization comprising (i) a separate section for each of the set of sites through which the data message flow passes, each section indicating at least a subset of the LFEs that process the data message flow in the corresponding site for the section, and (ii) a separate graphical user interface (GUI) item corresponding to each of the set of centralized routers.

2. The method of claim 1, wherein receiving flow tracing data comprises receiving flow tracing data from physical elements that implement the LFEs that process the data message flow at each of the set of sites through which the data message flow passes.

3. The method of claim 1, wherein the LFEs further comprise logical switches.

4. The method of claim 3, wherein the logical routers comprise (i) tier-0 logical routers that connect the logical network to external networks and (ii) tier-1 logical routers that segregate different groups of logical switches and connect to tier-0 logical routers.

5. The method of claim 1, wherein when a data message belonging to the data message flow is processed by a secondary centralized router of the particular logical router at the first site, the secondary centralized router forwards the data message to a primary centralized router via a set of remote tunnel endpoints (RTEPs).

6. The method of claim 5, wherein the RTEPs are displayed as a single GUI item between the section for the first site and the section for the different respective site at which the primary centralized router is located.

7. The method of claim 3, wherein:

a particular logical switch is implemented across at least two of the set of sites through which the data message flow passes; and when the source endpoint and the second endpoint are both connected to the particular logical switch, the visualization includes a first GUI item for the particular logical switch in the first site, a second GUI item for a set of remote tunnel endpoints (RTEPs) used to forward the data message between the first and second sites, and a third GUI item for the particular logical switch in the second site.

8. The method of claim 1, wherein the visualization comprises an indicator of latency between the first site and a subsequent site, the indicator displayed between a first section for the first site and a second section for the subsequent site.

9. The method of claim 1, wherein the visualization identifies a set of LFEs with one or more alarms triggered by displaying GUI items for the set of LFEs using an indicator.

10. The method of claim 1, wherein the visualization indicates a direction of the data message flow.

11. The method of claim 1, wherein the separate sections in the visualization are displayed in an order starting with a first section for the first site and ending with a second section for the second site, with sections for each site through which the data message flow passes between the first and second sites displayed in order between the first and second sections.

12. The method of claim 11, wherein the sections for each site through which the data message flow passes between the first and second sites are presented as collapsible within the visualization.

13. The method of claim 12, wherein:
within a particular section for a particular site, each LFE indicated as processing the data message flow within the particular site is presented as a separate GUI item; and
when the particular section is collapsed, the GUI items for the LFEs that process the data message flow at the particular site are not displayed.

14. The method of claim 11, wherein when a number of sites through which the data message flow passes between the first and second sites is above a threshold, the sections for the sites through which the data message flow passes between the first and second sites are automatically presented as collapsed within the visualization.

15. The method of claim 14, wherein each section that is collapsed within the visualization is expandable, wherein expanding a particular section corresponding to a particular site causes the visualization to display GUI items for at least a subset of the LFEs that process the data message flow in the particular site.

16. The method of claim 1, wherein the logical network is one of a plurality of logical networks, the data message flow is a first data message flow, the set of sites is a first set of sites, and the visualization is a first visualization, the method further comprising:
receiving flow tracing data regarding a second data message flow from a source endpoint in a third site to a destination endpoint in a fourth site, wherein the source endpoint in the third site belongs to a first logical network that accesses external networks via a first gateway logical router and the destination endpoint in the fourth site belongs to a second logical network that accesses external networks via a second gateway logical router, wherein the data message flow is processed according to a first set of LFEs of the first logical network in a first set of sites including the third site and a second set of LFEs of the second logical network in a second set of sites including the fourth site;
for each of a second set of sites through which the second data message flow passes, identifying the LFEs that process the second data message flow in the location; and
presenting a second visualization for the second data message flow, the second visualization comprising (i) a separate section for each of the second set of sites through which the data message flow passes, each section indicating the LFEs that process the data message flow in the corresponding site for the section and (ii) a GUI item representing a cloud between the first gateway logical router and the second gateway logical router indicating that the packet is forwarded through external networks from the first logical network to the second logical network.

17. A non-transitory machine-readable medium storing a program which when executed by at least one processing unit presents a visualization of a data message flow within a logical network that is implemented across a plurality of sites including a first site and a second site, the program comprising sets of instructions for:
receiving flow tracing data regarding the data message flow from a source endpoint in the first site to a second endpoint in the second site, the data message flow processed according to logical forwarding elements (LFEs) implemented in at least the first and second sites, the LFEs comprising logical routers;
for each of a set of sites including the first and second sites through which the data message flow passes, identifying the LFEs that process the data message flow in the site including a particular logical router implemented as a distributed router and a set of at least two centralized routers, each respective centralized router implemented in a different respective site; and
presenting a visualization for the data message flow, the visualization comprising (i) a separate section for each of the set of sites through which the data message flow passes, each section indicating at least a subset of the LFEs that process the data message flow in the corresponding site for the section, and (ii) a separate graphical user interface (GUI) item corresponding to each of the set of centralized routers.

18. The non-transitory machine-readable medium of claim 17, wherein:
one of the set of the centralized routers is designated as a primary centralized router and one or more other centralized routers of the set of centralized routers are designated as secondary centralized routers; and
each GUI item for a centralized router specifies whether the corresponding centralized router is designated as a primary centralized router or a secondary centralized router.

19. The non-transitory machine-readable medium of claim 18, wherein:
when a data message belonging to the data message flow is processed by a secondary centralized router of the particular logical router at the first site, the secondary centralized router forwards the data message to the primary centralized router via a set of remote tunnel endpoints (RTEPs); and
the RTEPs are displayed as a single GUI item between the section for first site and the section for the different respective site at which the primary centralized router is located.

20. The non-transitory machine-readable medium of claim 17, wherein:
the LFEs further comprise logical switches;

a particular logical switch is implemented across at least two of the set of sites through which the data message flow passes; and when the source endpoint and the second endpoint are both connected to the particular logical switch, the visualization includes a first GUI item for the particular logical switch in the first site, a second GUI item for a set of RTEPs used to forward the data message between the first and second sites, and a third GUI item for the particular logical switch in the second site.

21. The non-transitory machine-readable medium of claim 17, wherein the visualization comprises an indicator of latency between the first site and a subsequent site, the indicator displayed between a first section for the first site and a second section for the subsequent site.

22. The non-transitory machine-readable medium of claim 17, wherein:

the separate sections in the visualization are displayed in an order starting with a first section for the first site and ending with a second section for the second site, with sections for each site through which the data message flow passes between the first and second sites displayed in order between the first and second sections; and the sections for each site through which the data message flow passes between the first and second sites are presented as collapsible within the visualization.

23. The non-transitory machine-readable medium of claim 22, wherein:

within a particular section for a particular site, each LFE indicated as processing the data message flow within the particular site is presented as a separate GUI item; and when the particular section is collapsed, the GUI items for the LFEs that process the data message flow at the particular site are not displayed.

24. An electronic device comprising:

a set of processing units; and a non-transitory machine-readable medium storing a program which when executed by at least one processing unit presents a visualization of a data message flow within a logical network that is implemented across a plurality of sites including a first site and a second site, the program comprising sets of instructions for:

receiving flow tracing data regarding the data message flow from a source endpoint in the first site to a second endpoint in the second site, the data message flow processed according to logical forwarding elements (LFEs) implemented in at least the first and second sites, the LFE comprising logical switches;

for each of a set of sites including the first and second sites through which the data message flow passes, identifying the LFEs that process the data message flow in the site including a particular logical switch implemented across at least two of the set of sites through which the data message flow passes, wherein the source endpoint and the second endpoint are both connected to the particular logical switch; and presenting a visualization for the data message flow, the visualization comprising (i) a separate section for each of the set of sites through which the data message flow passes, each section indicating at least a subset of the LFEs that process the data message flow in the corresponding site for the section, and (ii) a first graphical user interface (GUI) item for the particular logical switch in the first site, a second GUI item for a set of remote tunnel endpoints (RTEPs) used to forward the data message through the first and second sites, and a third GUI item for the particular logical switch in the second site.

* * * * *